United States Patent [19]

Schrörs

[11] Patent Number: 4,916,748

[45] Date of Patent: Apr. 10, 1990

[54] INTERNAL SUPPORT ELEMENT FOR A HYDROSTATICALLY SUPPORTED ROLL

[75] Inventor: Günter Schrörs, Tönisvorst, Fed. Rep. of Germany

[73] Assignee: Eduard Küsters Maschinenfabrik GmbH & Co. KG, Krefeld, Fed. Rep. of Germany

[21] Appl. No.: 348,696

[22] Filed: May 8, 1989

[30] Foreign Application Priority Data

May 6, 1988 [DE] Fed. Rep. of Germany ....... 3815462

[51] Int. Cl.$^4$ .................... B21B 13/02; F16C 32/06
[52] U.S. Cl. .................................... 384/99; 29/116.1; 384/100
[58] Field of Search .................... 384/99, 12, 100, 114, 384/116, 118, 121; 29/110, 113.1, 113.2, 116.1, 116.2

[56] References Cited

U.S. PATENT DOCUMENTS

| | | | |
|---|---|---|---|
| 3,802,044 | 4/1974 | Spillmann et al. | 29/113 AD |
| 4,472,865 | 9/1984 | Schiel et al. | 29/116.2 |
| 4,726,691 | 2/1988 | Lehmann | 384/99 |
| 4,813,349 | 3/1989 | Pav et al. | 29/116.1 X |
| 4,825,520 | 5/1989 | Alajoutsijärvi et al. | 29/116.1 |
| 4,856,157 | 8/1989 | Küsters | 29/116.2 |

Primary Examiner—Thomas R. Hannon
Attorney, Agent, or Firm—Kenyon & Kenyon

[57] ABSTRACT

A support element for a hydrostatically supported roll comprises a contact surface that is formed from segments, which define the boundaries of supply pockets formed in the contact surface. The total extent of the segments in the circumferential direction of the hollow cylinder is constant over the length of the support element along the longitudinal direction of the roll.

3 Claims, 3 Drawing Sheets

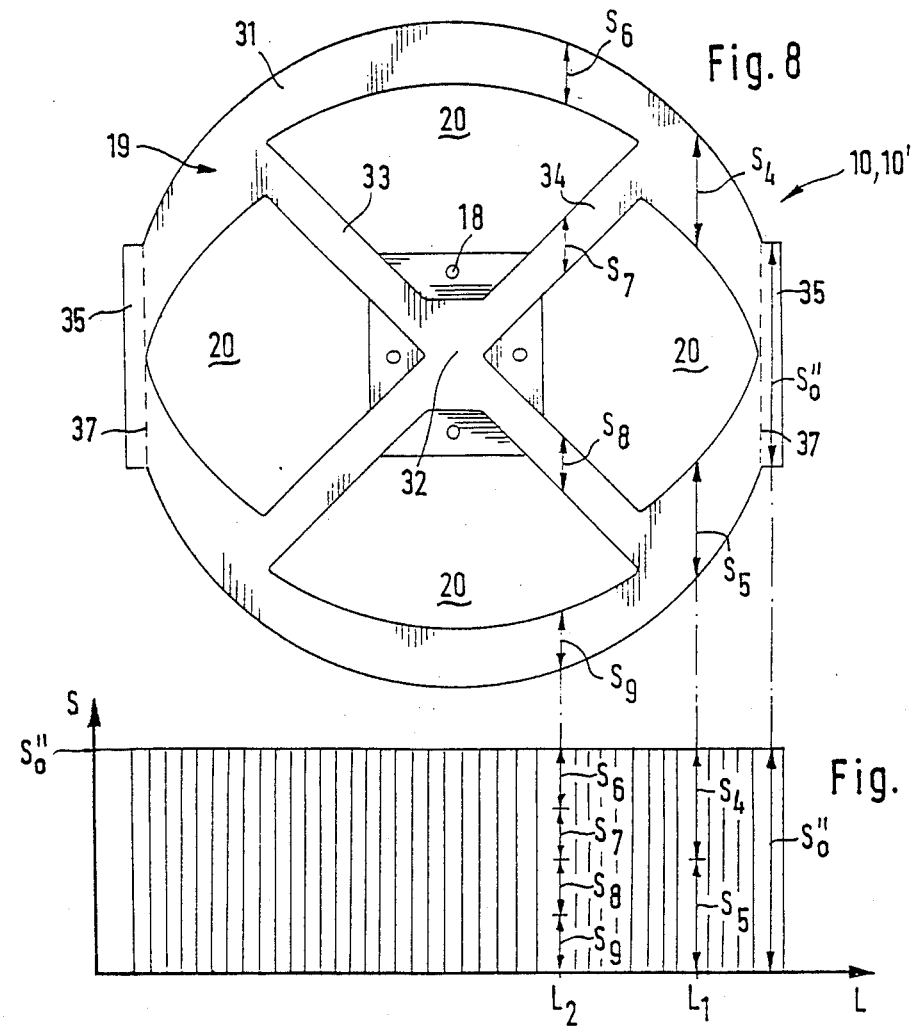

INTERNAL SUPPORT ELEMENT FOR A HYDROSTATICALLY SUPPORTED ROLL

BACKGROUND OF THE INVENTION

The invention relates generally to hydrostatically supported rolls and, more particularly, to an improved internal support element for such rolls.

Support elements for hydrostatically supported rolls are disclosed in German Patent No. 2230139. The support elements of this patent have a cylindrical contact surface that conforms to the inner circumference of the hollow cylinder for transmitting contact pressures, which act radially against the inner circumference of the hollow cylinder, via a load bearing liquid film. This liquid film is formed by hydraulic fluid, which constantly flows from supply pockets formed between segments on the top side of the support elements to avoid metallic friction between the contact surface and inner circumference of the cylinder.

When friction normally occurs between two solid surfaces, the attendant frictional forces and, hence, the dissipated energy that is converted into heat, are independent from the surface to which the contact pressure is transmitted. On the other hand, with roll support elements, fluid friction develops in the gap formed between the inner circumference of the hollow cylinder and the contact surface on the top side of the support elements. The fluid friction arises from the friction of the liquid in the gap, which is subjected to high pressure and high shear stress. This friction is dependent upon the extent of the gap, i.e., the circumferential extent of the segments formed on the top side of support elements, which define the contact surface. The greater the circumferential extent of the segments, the greater the length over which the liquid experiences friction and, therefore, the greater is the amount of frictional heat that is generated in the gap. The fact that a relationship exists between the size of the segments of the support elements and the generation of heat, which is dependent upon the fluid friction, is disclosed, per se, in German Published Patent Application No. 3611858. This relationship is not readily observed when the circumferential speed of the hollow cylinder is insignificant relative to the support elements. However, if the circumferential speed increases, a significant amount of power develops from the friction generated at each support element. With standard support element dimensions and a contact surface diameter of approximately 100 to 200 mm, this friction power can have a magnitude of 1 kW (kilowatt) and above, depending upon the circumferential speed of the hollow cylinder. When friction power of this magnitude is generated nonuniformly over the length of the support elements, due to the variable circumferential extent of the segments of the support elements, noticeable temperature differences occur along the outer circumference of the hollow cylinder. This temperature differential may have detrimental effects during certain treatments of paper webs, nonwoven fabrics or the like.

SUMMARY OF THE INVENTION

One of the problems to which the invention is directed is provision of a support element in which the heat generated over the length of the support element, which is conditional on the fluid friction, is uniform with respect to the axial direction of the hollow cylinder.

This goal is achieved by providing a support element for a hydrostatically supported roll having a rotatable hollow cylinder forming an outer working roll circumference and a stationary crosshead extending lengthwise through the hollow cylinder to form a surrounding clearance space between an outer circumference of the crosshead and an inner circumference of the hollow cylinder in which the support element is one of several support elements supported by the crosshead in at least one row formed along the length of the crosshead. The support element comprises a pressure chamber to which hydraulic fluid is conducted for pressing the support element against the inner circumference of the hollow cylinder and hydrostatic supply pockets formed in a curved contact surface at the top side of the support element. The curved contact surface has a radius corresponding to the radius of the inner circumference of the hollow cylinder. Hydraulic fluid is conducted to the supply pockets for forming a supporting fluid film between the curved contact surface and the inner circumference to support the hollow cylinder. The support elements include segments formed in the top portion of the support element having top surfaces that surround the hydrostatic supply pockets and define the curved contact surface wherein the total extent of the segments in the circumferential direction of the hollow cylinder is constant over the length of the support element along the longitudinal direction of the hollow cylinder.

By constructing the segments, which close the supply pockets and essentially seal them against the inner circumference of the hollow cylinder, in this manner, the fluid friction in the circumferential direction is constant over the entire length of the support elements along the longitudinal direction of the hollow cylinder. Consequently, the heat generated by the fluid friction is uniformly generated over the length of the individual support element to avoid temperature differentials.

When a uniform temperature distribution over the entire roll is desired, the individual support elements should be spaced as closely together as possible. When the support elements are arranged in several rows, the elements should be relatively displaced in the circumferential direction. In this manner, with one or several rows the entire roll length is as evenly covered with support elements as possible.

The construction of the axial ends of the support elements may be formed as generally parallelogram-shaped or rectangular segments to achieve the desired constant circumferential extent.

Further features, advantages and embodiments of the invention are apparent from consideration of the following detailed description, drawings and appended claims.

BRIEF DESCRIPTION OF THE INVENTION

FIG. 1 schematically shows a longitudinal cross section of a hydraulically supported roll;

FIG. 4 shows a top view of the contact surface of a conventional support element constructed according to the support element illustrated in FIG. 2;

FIG. 5 is a graphical representation of the total circumferential extent of the segments on the top side of the support element of FIG. 4;

FIGS. 6 and 7 show a corresponding top view and graphical representation of another type of known support element;

FIG. 8 shows a top view of the contact surface of a support element constructed according to the principles of the invention;

FIG. 9 shows a graphical representation of the total circumferential extent of the segments on the top side of the support element of FIG. 8.

DETAILED DESCRIPTION

Figure 1:
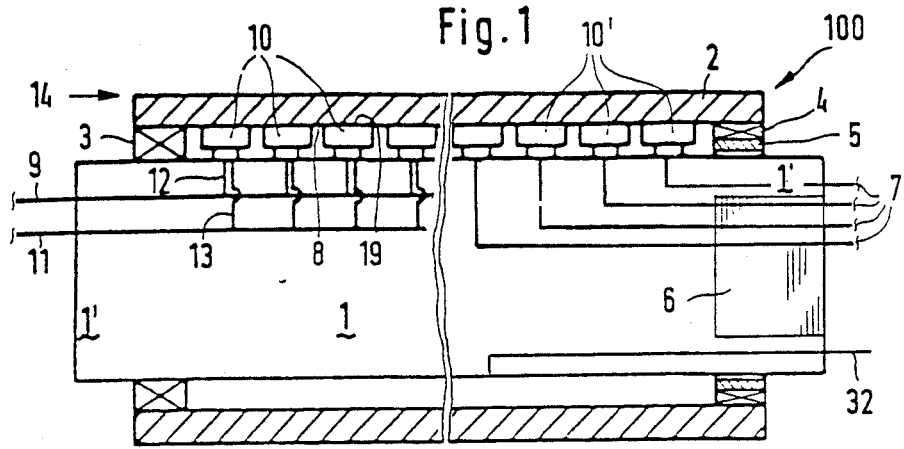

The roll 100 in FIG. 1 comprises a stationary crosshead 1, which extends lengthwise through a rotatable hollow cylinder 2 to form an annular clearance space between the inner circumference 8 of cylinder 2 and the outer circumference of the crosshead. The ends 1' of the crosshead 1 project out of the hollow cylinder 2 and are supported, in a well known, but unillustrated manner, in a roll stand, calender, or similar support structure.

In the specific embodiment shown at the left half of FIG. 1, the hollow cylinder 2 is supported on the crosshead 1 by a roller bearing 3. An alternative support embodiment is depicted on the right side of the hollow cylinder 2 in which the hollow cylinder 2 is supported by a bearing 4 disposed on a guide ring 5, which can shift radially a small amount, but cannot rotate relative to the crosshead 1, i.e., for example, the ring 5 can move from the top to the bottom according to FIG. 1. Two mutually opposing flat surfaces 6 are provided on the crosshead 1 to cooperate with corresponding guide surfaces (not shown) on guide ring 5, which slide on the flat surfaces 6. The bearing 3 is capable of transmitting forces from the hollow cylinder 2 to the crosshead 1 in the effective direction or action plane of the roller 100, while the purpose of bearing 4 is to guide only in a direction perpendicular to the active plane. In this manner, forces cannot be transmitted between the hollow cylinder 2 and the crosshead 1 in the active plane because of the ability of guide ring 5 to shift in this direction. Of course, in an actual roll, the support structure is the same on both ends of the hollow cylinder. FIG. 1 sets forth examples of types of support structure that may be employed in rolls provided with the support elements of the invention.

Eight support elements 10,10' are visible in FIG. 1, which are equidistantly spaced over the length of the hollow cylinder 2. Elements 10,10' are supported on the crosshead 1 such that their contact surfaces 19 abut the inner circumference 8 of the hollow cylinder 2. It is possible to provide fewer support elements or, if the roller 100 is longer, to provide more support elements. The support elements 10 at the left half of FIG. 1 may be supplied with two separate hydraulic fluids by separate supply lines 9,11 and respective branch lines 12,13, each of which are connected to the individual support elements 10 in a manner disclosed in the copending application Ser. No. 07/337,254, filed Apr. 13, 1989 and entitled "Hydrostatically Supported Roll," which is assigned to the assignee of this invention. As explained in more detail in the above-noted application, the disclosure of which is incorporated by reference herein, one hydraulic fluid acts to press the support elements 10 against the inner circumference 8 of the hollow cylinder 2, while the other is conducted to the supply pockets to form the fluid-bearing film between the support elements 10 and inner circumference 8.

Unlike the support elements 10, each of the support elements 10' has an individual supply line 7 for supplying a single hydraulic fluid that performs both load-supporting and fluid-bearing functions. The construction of the support elements 10, 10' is explained in further detail below, with reference to FIGS. 2 and 3.

In the illustration of FIG. 1, the roll nip 14 is formed on the top of roll 100, i.e., it is formed between a counterroll (not shown) arranged above the outer working circumference of the hollow cylinder 2 and roll 100. As is well known in the art, the resulting load is distributed over the length of the hollow cylinder 2 and transmitted to the crosshead 1 in the inner areas of the hollow cylinder's longitudinal extent by the support elements 10,10'. In this manner, the crosshead 1 bends under this line load, but the hollow cylinder 2 is insulated from the resulting deformations, which are conditional upon the load.

Figure 2:
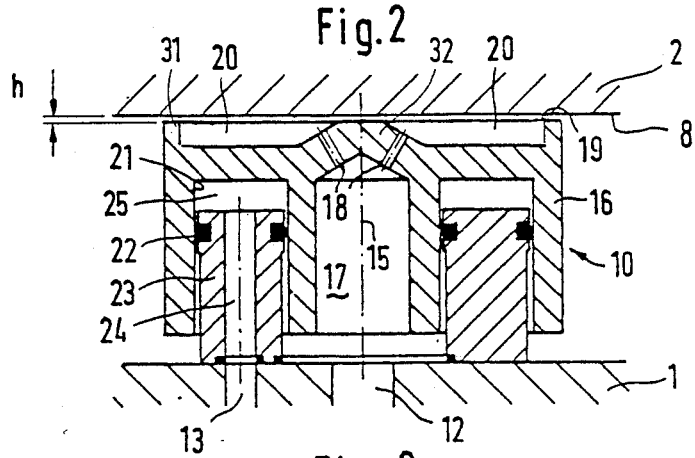
FIGS. 2 and 3 show, on an enlarged scale, longitudinal cross sections of different types of roll support elements.

FIG. 2 depicts a single support element 10, which has a longitudinal axis 15 parallel to the active or effective direction of the roll. A central bore 17 is disposed about axis 15, which does not extend through to the top side of the support element 10. Four restrictor ducts 18, which are equidistantly distributed about the axis 15, are formed at the upper end of bore 17. The housing 16 of the support element 10 has an approximately circular cross section taken in a plane perpendicular to the plane of FIG. 2. The top side of housing 16 has a contact surface 19, which faces the inner circumference 8 of the hollow cylinder 2 and forms a supporting surface that is curved along the circumferential direction of cylinder 2 to conform with the inner circumference 8. The contact surface 19 may be formed as a generally cylindrical surface having a diameter corresponding to the curvature of inner circumference 8. The cylindrical surface is formed about a longitudinal axis that is perpendicular to the axis 15 and parallel to the longitudinal axis of the roll.

Four flat, fluid supply pockets 20 formed in the contact surface 19 are separated from each other and bounded by segments 31,32 upwardly projecting from the top side of housing 16. Each supply pocket 20 is connected by one of the choke bores 18 to the bore 17. The use of four supply pockets 20 stabilizes the interaction between the support element 10 and the inner circumference B below an even gap width h.

As shown in FIG. 2, an annular cylinder 21 is formed in the housing 16 underneath the supply pockets 20 concentric with the axis 15. An annular piston 23, which is sealed by gaskets 22 and tightly attached to the top side of the crosshead 1, is disposed in the annular cylinder 21. Thus, the housing 16 of the support element 10 can move relative to the annular piston 23 in a direction parallel to the axis 15.

The annular piston 23 has a bore 24 formed about an axis parallel to axis 15. Bore 24 is connected to a branch line 13 such that the enclosed pressure chamber 25 formed above the annular piston 23 is connected to the supply line 11 shown in FIG. 1. On the other hand, the open end of bore 17 is connected to the branch line 12, which is connected to the supply line 9 depicted in FIG. 1.

Operation of the support element 10 is disclosed in more detail in the above-referenced copending application. A 25, which causes the support element 10 to be pressed against controllable, constant pressured is maintained in the chamber the inner circumference 8 of the hollow cylinder 2, and a controlled volume or flow of hydraulic fluid is supplied to the supply pockets 20 such that the pressure in the supply pockets 20 is automatically adjusted. The controlled volume of hydraulic fluid supplied to pockets 20 flows over the gap h to the outside of the support element such that a load-bearing liquid film is formed at the contact surface, i.e., at the top surface of the segments 31,32, which face the inner circumference 8. In this manner, the inner circumference 8 of the hollow cylinder 2 is supported on the liquid film by the support element 10. Hydraulic fluid is Carried via line 9, the branch lines 12, bores 17 of the individual support elements 10 and the restrictor ducts 18 to the supply pockets 20. Since the supply pockets are bounded on all sides by the contact surface 19, i.e., by the segments 31,32, which define the pockets, and since the supply pockets closely abut, for the most part, the inner circumference 8 of the hollow cylinder, a hydrostatic pressure builds up in the supply pockets 20 that acts against the inner circumference 8 of the hollow cylinder 2. When this pressure rises, the inner circumference 8 is lifted somewhat from the contact surface 19, whereby hydraulic fluid flows from the individual supply pockets over the somewhat increased gap h to the outside of the support element. Due to the action of the choke bores 18, the pressure in the supply pockets 20 then immediately drops thereby reducing the size of the gap h formed between the contact surface 19 and the inner circumference 8. In this manner, a state of equilibrium is produced that maintains a predetermined gap width h. During operation of the support elements 10 described above, the pressure in the pressure chamber 25 and the volume of hydraulic fluid in the supply pockets 20 are the same for all of the individual support elements 10.

Figure 3:
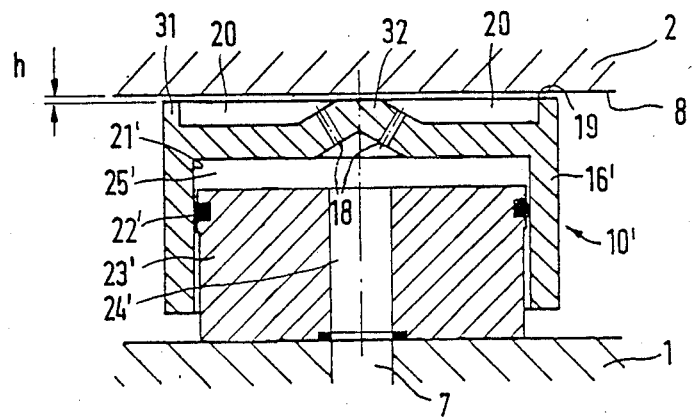

In the support elements 10' of FIG. 3, instead of the annular piston 23, a cylindrical piston 23' is provided having a central through hole 24' connected to the supply line 7. The piston 23' is disposed within the cylindrical recess 21' of the housing 16' and is sealed therein by means of a peripheral gasket 22'. The pressure chamber 25', which is formed above the piston 23' and supplied with hydraulic fluid via a supply line 7, is connected to the supply pockets 20 via choke bores 18. Thus, While the hydraulic fluid in the pressure chamber 25 is separate from the hydraulic fluid in the supply pockets 20 of the support element 10, the same hydraulic fluid is used for both the pressure chamber 25' and pockets 20 of the support element 10'. The fluid that initially enters into the pressure chamber 25' is conducted via bores 18 to the supply pockets 20.

The principles of invention may be applied to the types of support elements described above, as well as other types of support elements, as long as the support element has a contact surface, such as 19, that is formed from segments, such as 31,32, to produce a gap h with the inner circumference of the hollow cylinder.

A top view of the support elements of FIGS. 2 or 3 is shown in FIG. 4. FIG. 5 shows a graph in which the total extent S of the segments of the contact surface 19 along the circumferential direction of the hollow cylinder is illustrated versus the length L of the support element in the axial, i.e., longitudinal, direction of the hollow cylinder 2. The circumferential extent S is represented in half scale, while the length L is represented in actual scale.

At the point $L_O$, the total extent $S_O$ in the circumferential direction of the hollow cylinder 2 is the sum of three individual circumferential extents $S_1$, $S_2$ and $S_3$. The sum $S_O$ is illustrated graphically in FIG. 5 in half scale. The same relationship applies at all other points along the length of the support element. Generally, the equation $$S = \Sigma S_i$$

applies, where i is the number of segments at a specific location.

It is apparent from FIG. 5 that the total extent S of the contact surface 19 and, thus, the total circumferential extent of the gap h varies considerably over the length of the support element in the axial direction of the hollow cylinder 2. A similar representation shown in FIGS. 6 and 7 in which the contact surface of the support element has a square shape, also results in considerable differences in the total extent S over the length L.

On the other hand, in the embodiment of the invention illustrated in FIG. 8, the segments are constructed such that their total extent S in the circumferential direction of the hollow cylinder is the same at every point along the length of the support element 10,10'. In the S, L graph of FIG. 9, S, therefore, is constant over the length L. Thus, at every location along the longitudinal axis of the hollow cylinder 2, the circumferential extent of gap h has the same total extent $S_O''$.

As shown in FIG. 8, the top side of the support elements 10,10' has a somewhat circular peripheral segment 31, which is diametrically crossed by two diagonal segments 33,34, lying below 90° such that four supply pockets 20 are formed. Pockets 20 are fed with fluid via restrictor ducts 18. The resulting middle segment area 32 at the intersection of the segments 33,34 also is shown in FIGS. 2 and 3.

The supply pockets 20 disposed at the axial ends of the support element, i.e., the pockets disposed at the extreme right and left of FIG. 8, are bordered by a rectangular segment section 35, which is limited on the inside by an imaginary line 37. The longer sides of rectangular segment 35 are situated along the circumferential direction of the hollow cylinder. The length of the longer sides is the same as the total extent $S_O''$, which is constant over the length L. At the point $L_1$, the total circumferential extent is the sum of individual extents $S_4$ and $S_5$, while at point $L_2$, the total extent is the sum of the four extents $S_6$, $S_7$, $S_8$ and $S_9$, as can be inferred from FIGS. 8 and 9.

Figure 10:
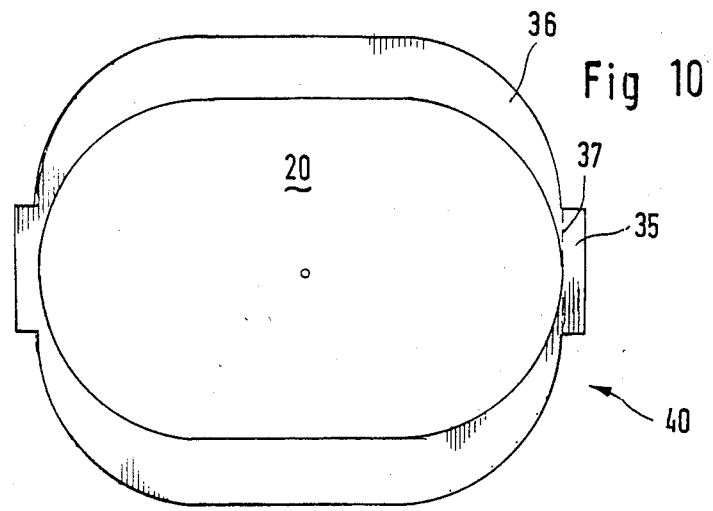
FIGS. 10, 11 and 12 show top views of the contact surfaces of further embodiments of the invention.

A further embodiment of the invention in the form of a support element 40 is depicted in FIG. 10. It comprises a single supply pocket 20 having an oval shape, which is bordered by a peripheral segment 36. A rectangular segment section 35 also is provided at the axial ends of the support element. Both of the longer sides of rectangular segment 35 extend along the circumferential direction and this section is limited on the inside by an imaginary line 37, which is shown at the axially outermost portion of the supply pocket 20.

Figure 11:
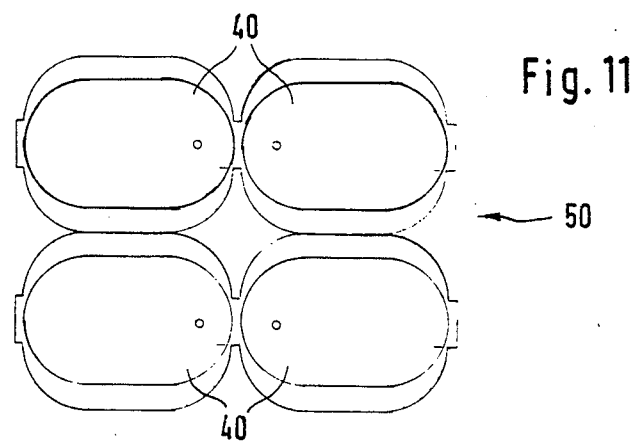

Four support elements 40 may be combined to form a new support element 50, as is apparent from the embodiment of FIG. 11, which is a more stabilized construction with regard to the gap h than the FIG. 10 embodiment.

Figure 12:
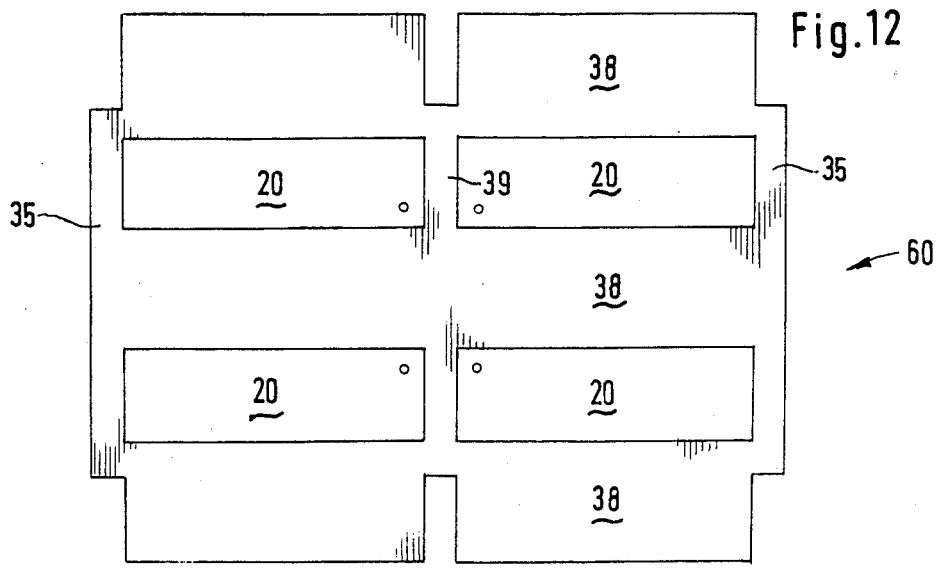

In the support element embodiment 60 of FIG. 12, four rectangular supply pockets 20 are arranged such that they are surrounded by segments 38, which extend parallel to the longer sides of the rectangles, and by segments 39, which extend between the supply pockets 20 parallel to the shorter sides of the rectangles. The axial boundaries are provided with rectangles 35, whose circumferential extent once again corresponds to the total circumferential extent.

The support elements 40,50,60, are constructed such that when the total extent S is plotted over the longitudinal length L of the respective support element, a constant total circumferential extent, indicated by a horizontal line, results, such as shown in FIG. 9. The value $S_O''$ of the total extent represented by the horizontal line may differ depending upon the particular element employed.

What is claimed is:

1. A support element for a hydrostatically supported roll having a rotatable hollow cylinder forming an outer working roll circumference and a stationary crosshead extending lengthwise through the hollow cylinder to form a surrounding clearance space between an outer circumference of the crosshead and an inner circumference of the hollow cylinder in which the support element is one of several support elements supported by the crosshead in at least one row formed along the length of the crosshead, said support element comprising:

(a) a pressure chamber to which hydraulic fluid is conducted for pressing the support element against the inner circumference of the hollow cylinder;
    (b) hydrostatic supply pockets formed in a curved contact surface at a top portion of the support element, said curved contact surface having a radius corresponding to the radius of the inner circumference of the hollow cylinder, whereby hydraulic fluid is conducted to the hydrostatic supply pockets for forming a supporting fluid film between the curved contact surface and the inner circumference to support the hollow cylinder; and
    (c) segments formed in the top portion of the support element having surfaces that surround said hydrostatic supply pockets and define said curved contact surface wherein the total extent of the segments in the circumferential direction of the hollow cylinder is constant over the length of the support element along the longitudinal direction of the hollow cylinder.

2. The support element of claim 1 wherein said support element has a boundary formed at each of its axial ends as a generally parallelogram-shaped segment having two spaced, parallel sides disposed along the circumferential direction of the hollow roll, with an inner one of said parallel sides being disposed at the outer periphery of one of the supply pockets.

3. The support element of claim 2 wherein said generally parallelogram-shaped segment is rectangular.

* * * * *

UNITED STATES PATENT AND TRADEMARK OFFICE
CERTIFICATE OF CORRECTION

PATENT NO.   :   4,916,748
DATED        :   April 10, 1990
INVENTOR(S)  :   Günter Schrörs It is certified that error appears in the above-identified patent and that said Letters Patent is hereby corrected as shown below:

In Column 4, lines 65 through 67, delete

"A 25, which causes the support element 10 to be pressed against controllable, constant pressured is maintained in the chamber the inner circumference 8..."

and substitute therefor

--A controllable, constant pressure is maintained in the chamber 25, which causes the support element 10 to be pressed against the inner circumference 8...--

Signed and Sealed this

Eleventh Day of June, 1991

Attest:

HARRY F. MANBECK, JR.

*Attesting Officer*　　　*Commissioner of Patents and Trademarks*